US012457166B1

(12) United States Patent
Wijnands et al.

(10) Patent No.: US 12,457,166 B1
(45) Date of Patent: Oct. 28, 2025

(54) STATELESS MESSAGE BUS IN A CORE NETWORK

(71) Applicant: GRAPHIANT, INC., Fremont, CA (US)

(72) Inventors: Ijsbrand Wijnands, Leuven (BE); Neale Ranns, Hure (FR)

(73) Assignee: GRAPHIANT, INC., Fremont, CA (US)

(*) Notice: Subject to any disclaimer, the term of this patent is extended or adjusted under 35 U.S.C. 154(b) by 725 days.

(21) Appl. No.: 17/521,656

(22) Filed: Nov. 8, 2021

Related U.S. Application Data

(63) Continuation of application No. 17/506,552, filed on Oct. 20, 2021, now abandoned.

(51) Int. Cl.
*H04L 45/16* (2022.01)
*H04L 12/18* (2006.01)
*H04L 45/02* (2022.01)

(52) U.S. Cl.
CPC .............. *H04L 45/16* (2013.01); *H04L 12/18* (2013.01); *H04L 45/02* (2013.01)

(58) Field of Classification Search
CPC ..... H04W 48/16; H04W 60/00; H04W 4/021; H04L 67/55; H04L 63/1425; H04L 63/1441; H04L 63/0236; G06Q 30/0202
See application file for complete search history.

(56) References Cited

U.S. PATENT DOCUMENTS

2018/0020339 A1* 1/2018 Agiwal ................ H04W 12/08
2018/0368057 A1* 12/2018 Asterjadhi .......... H04W 48/16
2023/0370893 A1* 11/2023 Stare ................ H04W 28/0831

* cited by examiner

*Primary Examiner* — Iqbal Zaidi
(74) *Attorney, Agent, or Firm* — Maschoff Brennan

(57) ABSTRACT

Embodiments of a stateless message bus in a network service architecture are disclosed. For example, a method includes transmitting, by a core node, a single aggregated discovery message periodically on behalf of a group of enterprise nodes associated with a first multicast group address. The first multicast group address is one of one or more multicast group addresses associated with the core node and the group of enterprise nodes. The method further includes exchanging, by the core node, one or more crates with a set of core nodes in the core network by advertising the one or more crates over a broadcast channel. Each of the one or more crates advertised by the core node comprises information corresponding to the one or more multicast group addresses associated with the core node, and the set of core nodes have an active status indicated by the single aggregated discovery message.

17 Claims, 8 Drawing Sheets

STATELESS MESSAGE BUS IN A CORE NETWORK

CROSS REFERENCE TO RELATED APPLICATIONS

This application is a continuation of U.S. Non-Provisional patent application Ser. No. 17/506,552, titled "STATELESS MESSAGE BUS IN A CORE NETWORK", filed on Oct. 20, 2021, which is assigned to the assignee hereof and hereby, expressly incorporated by reference herein.

FIELD OF THE INVENTION

The embodiments discussed in the present disclosure are generally related to core networks. In particular, the embodiments discussed are related to stateless message bus in a core network.

BACKGROUND OF THE INVENTION

Numerous service providers (SPs) offer a host of connectivity and security services to enterprises/customers, who deploy their respective networks via one or more devices, commonly known as, customer premise equipments (CPEs). Customers get the benefit of not having to deal with core transport services because the core routing infrastructure is typically owned/managed by the SP. The core routing infrastructure may typically be shared across multiple enterprise customers.

Various enterprises or more particularly CPEs of various enterprises exchange information amongst themselves through a medium, such as a tunnel. This medium allows the CPEs to exchange information with other CPEs within an enterprise or with CPEs of different enterprises, such as in a multi-enterprise network. Typically, a CPE will exchange information with many, potentially thousands of other, CPEs in an enterprise network. Thus, this information exchange is a one-to-many or a multicast exchange of information. Since the information exchange is multicast, the core network also needs to be enabled for multicast communication for exchanging information.

The core network may be agnostic to an association between an enterprise and a CPE and may ensure that certain CPEs are grouped together for the purpose of information exchange. A CPE may be part of multiple groups, for example, a group may be formed by a collection of CPEs that are part of a particular enterprise network. In order to exchange information between a group of CPEs, a multicast network identifier may be used that groups the CPEs together and enables forwarding of the actual data packets through the core network. The multicast network identifier may be configured on device(s) associated with the enterprises, such as CPEs, and on core node(s) of the core network. There are multiple benefits of grouping together the CPEs. For example, a signaling protocol between the CPE and the core network may not be needed. Second, the core node may disregard packets based on the multicast group identifier in a packet. Only those packets that match the expected multicast group identifier on the core network may be allowed. This approach helps to protect the core network in scenarios where a CPE is hacked, and the multicast group identifier is changed as part of a potential attack on the core network.

When a first CPE transmits packets using a multicast group identifier, the first CPE can address all the other CPEs that are part of the same multicast group and have the same multicast group identifier. It is important for CPEs to know which other CPEs participate inside that group for the purpose of reliability. One approach is to have each CPE send out "Hello" messages to all other CPEs in a specific multicast group. Sending out "Hello" messages over a medium is a common way for discovery. However, in certain scenarios, a large number of CPEs participating in the discovery process may lead to inefficiencies. For example, when there are 10000 CPEs, and each CPE triggers a packet comprising "Hello" message periodically, every CPE will receive many of these "Hello" messages. This may be inefficient especially when there are a large number of CPEs that are part of a multicast group and when there are a lot of multicast group identifiers associated with each CPE.

Further, existing networks use routing protocols like Border Gateway Protocol (BGP) or Overlay Management Protocol (OMP) that use a route reflector in the cloud to store and replicate information exchange between CPEs.

Another issue with the existing approaches is that each core node in a core network knows about the multicast group identifiers associated with it but does not know about other core nodes that are associated with those multicast group identifiers. Hence, the core node may not know the next hop (core node) that is associated with the multicast group identifier for transferring a received packet. Therefore, there exists a need for CPEs to efficiently exchange information from one-to-many in view of at least the above-mentioned issues, without using a controller and/or cloud resources.

SUMMARY OF THE INVENTION

Embodiments of a stateless message bus in a core network are disclosed that address at least some of the above-mentioned challenges and issues.

In accordance with the embodiments of this disclosure, a method is disclosed. The method includes transmitting, by a core node, a single aggregated discovery message periodically on behalf of a group of enterprise nodes associated with a first multicast group address. The first multicast group address is one of one or more multicast group addresses associated with the core node and the group of enterprise nodes. The method further comprises exchanging, by the core node, one or more crates with a set of core nodes in the core network by advertising the one or more crates over a broadcast channel. Each of the one or more crates advertised by the core node comprises information corresponding to the one or more multicast group addresses associated with the core node. Further, the set of core nodes have an active status indicated by the single aggregated discovery message.

In accordance with the embodiments of this disclosure a core node in a core network comprises a processor and a memory storing computer-executable instructions that when executed, cause the processor to transmit, a single aggregated discovery message periodically on behalf of a group of enterprise nodes associated with a first multicast group address. According to the embodiments of this disclosure the first multicast group address is one of one or more multicast group addresses associated with the core node and the group of enterprise nodes. Further, the processor of the core node exchanges one or more crates with a set of core nodes in the core network by advertising the one or more crates over a broadcast channel. Each of the one or more crates advertised by the core node comprises information corresponding to the one or more multicast group addresses associated with the core node. Further, according to the embodiment the set of core nodes have an active status indicated by the single aggregated discovery message.

In accordance with the embodiments of this disclosure, another method is disclosed. The method includes exchanging one or more crates by a core node in the core network. The method comprises masking a set of multicast group addresses with bits indicating association of each corresponding multicast group address of the set of multicast group addresses with the core node. Further, the method includes dividing the masked bits into one or more crates for exchanging the one or more crates with a set of core nodes in the core network by advertising the one or more crates over a broadcast channel. The method describes that the set of core nodes have an active status indicated by a single aggregated discovery message transmitted periodically on behalf of a group of enterprise nodes associated with a first multicast group address of the set of multicast group addresses. Further, according to the method, the core node is associated with the first multicast group address.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
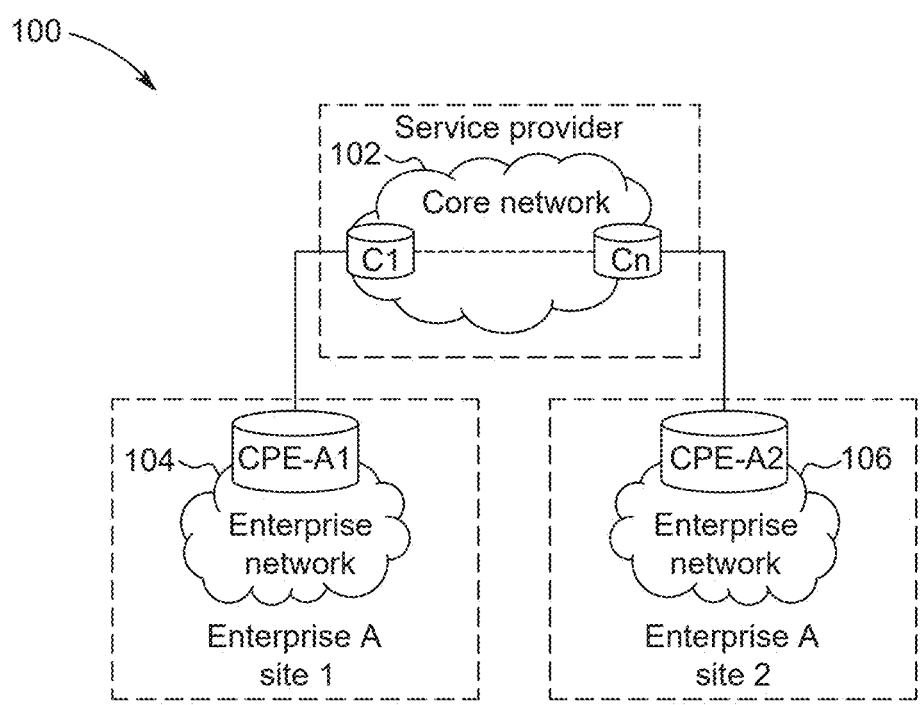
FIG. 1 illustrates a network architecture for implementing disclosed embodiments of a secure communication network, according to an embodiment.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

A service provider (SP) typically operates and provides a core network over which data or traffic is routed to and/or from one or more enterprise customers. The disclosed architecture provides a method for the SPs to provide connectivity services to the one or more enterprise customers over their shared core infrastructure. This may be achieved by establishing a stateless message bus through the core network by using multicast group address for transferring a packet. Customer specific routing information is not present on the core/PE nodes. Within the context of the disclosure, the core network enables routing of multicast traffic through one or more paths. A path may include a number of hops, where each hop identifies a link between adjacent nodes in the core network.

The disclosed solution/architecture provides a mechanism of establishing a stateless message bus through the core network. In an embodiment, this may be achieved by having all the core nodes generate "Hello" messages on behalf of the CPEs. As such, a given core node aggregates the "Hello" messages from all the connected CPEs that are part of the same multicast group identifier in a single packet. The consequent reduction of the number of "Hello" messages enable more CPEs, that are part of the same multicast group identifier, to be connected to the given core node without increasing or adding to the number of "Hello" messages. Also, a core node advertises its membership in various multicast group identifiers to all other core nodes in the core network as the core node does not know which other core nodes have potential interest in it. This enables each core node that has received the advertisement from other core nodes to use this information to determine a next hop (core node) to transfer the received packets towards a recipient CPE.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data/traffic via the established communication paths.

A "service provider" may refer to an entity providing, managing, and/or operating a core network, over which data is routed to and/or from one or more enterprise customers. The disclosed architecture provides a method for the SPs to provide connectivity services to the one or more enterprise customers over the core network, which is a shared core infrastructure. Non-limiting examples of SPs may include Secure Access Service Edge (SASE) providers, Network as a Service (NaaS) providers, Multiprotocol Label Switching (MPLS) Virtual Private Network (VPN) providers, and Software Defined Wide Area Network (SD-WAN) providers.

A "core network" may refer to a network infrastructure that may provide services to connect one or more enterprise networks with each other. The core network represents a central or core element that provides one or more routing paths for exchange of information between different enterprise networks. The core network may facilitate high-capacity communication between different enterprise networks located at different geographical locations. Therefore, the core network may be interchangeably referred herein as the "service provider network", "service provider core network/SP core network", "service provider core/SP core", or "backbone" without departing from the scope of the ongoing description. The core network may include but is not limited to segment routed Multiprotocol Label Switching (MPLS) network, Internet Protocol (IP) version 6 (IPv6) segment routed network, IP version 4 (IPv4) segment routed network, and Path Computation Element (PCE) based segment routed network.

A "core node" may refer to any node within the core network, which is capable of routing data packets to another core node within the core network. The core node may include, but not limited to an access point, a router, a bridge, a server, a gateway, a switch, a modem, a relay, or a hub.

An "enterprise network" may refer to a network owned, leased, and/or managed by customers, which may include one or more business entities. By way of an example, the enterprise network may refer to internal network infrastructure employed by an enterprise or organization to provide connectivity among users, devices, and applications that are local to the enterprise. Various such enterprise networks located at different sites may need to be connected to each other via a core network for external communication. Therefore, an enterprise network may include one or more internal networks that are located at geographically separate sites.

In the core network, an "ingress core node" handles incoming data from another network such as an enterprise network. In the core network, an "egress core node" handles outgoing data to another network. An "intermediate core node" refers to a node between the ingress core node and the egress core node in the core network. In the examples provided in this disclosure, "Cx" generally refers to core nodes (e.g., C1, C2, C3 and so on), "C1" refers to the ingress core node, C2 refers to the intermediate core node, and C3 refers to the egress core node.

A "unicast" data transmission refers to one-to-one transmission from one point to another point in a network. A "multicast" data transmission refers to one-to-many transmission from one point to many points in a network.

Furthermore, a "data packet" refers to data or information that is packaged for transmission over a network. The data packet created by the source node or ingress CPE may include a payload portion, a metadata portion, and one or more headers. In an embodiment, the metadata may include the one or more headers while in another alternate embodiment, the one or more headers in the data packet may be partially or completely excluded from the metadata portion. The headers may include one or more of, but not limited to, an inner internet protocol (IP) header and an outer IP header. The payload portion may include data (e.g., customer related data) that the source node of an enterprise network may intend to transmit to the destination node of the enterprise network. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another.

Further, the terms "data" or "traffic" are interchangeably used in this disclosure and refer to any type of information, such as but not limited to messages, voice, video, media, or any other information in any appropriate format that may be communicated from one point to another.

A "routing path" may refer to a traversal path for a given data packet in the core network. The routing path may include a number of hops from one core node to another core node, within the core network. Herein, each core node may be connected to another core node within the core network, via a "hop". Similarly, a core node may be connected to subsequent node in an enterprise network (such as a CPE) via another hop.

The term "crate" according to the ongoing disclosure may be referred to as a mechanism of compression of multicast addresses. More particularly, compression of each multicast address indicated as a bit position in a string of bits is referred to in this description as "crates." The resulting string of bits is also referred to as "crates" in this description. Each bit position indicates a multicast address in the crate, which can be either set or not set. For example, a given bit position, in the crate, for a specific multicast address may be set if a core node is a part of the specific multicast address. Likewise, a given bit position, in the crate, for a specific multicast address may not be set if a core node is not a part of the specific multicast address. Thus, the collection of bit positions shipped together may be referred to as a "crate of bits." According to this disclosure, collection of bit positions or "crate of bits" may be broadcasted on a control plane (as control plane communication) by each core node to all other core nodes of the core network.

The term "message bus" may refer to a common data infrastructure or a common command/control infrastructure or a common messaging infrastructure that allows different entities or devices or systems to communicate through a shared set of interfaces. Thus, a message bus may be a communication bus in a computer system, which serves as a focal point for communication between the CPU, main memory, and peripherals. Similarly, the term "stateless message bus" may refer to a message bus that enables stateless multicast forwarding. Stateless multicast forwarding is achieved by core nodes while forwarding a multicast packet based on an address information in a BIER header of the multicast packet. All intermediate core nodes merely forward the multicast packet and do not store the actual data comprised in the multicast packet. In fact, all the intermediate core nodes are "hop-on" core nodes that are used for forwarding the multicast packet without looking at the actual contents of the multicast packet. Hence, such forwarding of the multicast packet by the core nodes is termed as stateless multicast forwarding and the stateless message bus is a channel or medium on which the stateless multicast forwarding may be executed.

Contents of https://datatracker.ietf.org/doc/html/rfc8296 are fully incorporated herein by reference in the context of BIER bits. BIER is an architecture that provides optimal multicast forwarding through a "multicast domain", without requiring intermediate core nodes to maintain any per-flow state or to engage in an explicit tree-building protocol. When a multicast packet enters the multicast domain, the ingress core node determines the set of egress core nodes to which the packet needs to be sent. The ingress core node then encapsulates the multicast packet in a BIER header. The BIER header contains a bit string in which each bit represents exactly one egress core node in the multicast domain. In order to forward the multicast packet to a given set of egress core nodes, the bits corresponding to those core nodes may be set in the BIER header. The details of the encapsulation depend on the type of network used to realize the multicast domain.

In general, the core networks and enterprise networks may include any known network infrastructure in the context of telecommunication networks. In the spirit of the ongoing disclosure, such network infrastructure may at least include one or more nodes such as, but not limited to, access points, routers, bridges, servers, gateways, switches, modems, relays, and hubs. The enterprise networks may include one or more of the above-mentioned nodes in addition to one or more customer premises equipment(s) (CPEs), which are located within the premises of the enterprise networks. The CPEs may include, but not limited to, gateways, switches, routers, network adapters, set top boxes, and so on.

An "endpoint device" may be any device associated with customers, individuals, or end users. The endpoint device may be a source node and/or a destination node to transmit and/or receive data packets from customer premises equipments (CPEs) via the core network. In an embodiment, the source node may create and transmit the data packets to the destination node, via the ingress CPE, core network, and the egress CPE. The endpoint device may include, but is not limited to, a computer, a personal digital assistant (PDA), a laptop, a cellular telephone, a tablet, or any other device or network element capable of initiating or exchanging data within one or more communication networks.

"Cx" refers to core nodes (e.g., C1, C2, C3) in the core network. A "core node" may refer to any node capable of routing data within the core network such as, but not limited to an access point, a router, a bridge, a server, a gateway, a switch, a modem, a relay, or a hub.

Any core node may be an ingress core node/PE which handles incoming traffic from another network, or an egress core node/PE which handles outgoing traffic to another network.

A CPE may include any device that is located within the premises of a customer's enterprise network. An "ingress CPE" may receive data packet(s) originated from an endpoint device and perform encryption and/or encapsulation on the received data packets to create encrypted and/or encapsulated data packet(s). The ingress CPE may transmit the encrypted and/or encapsulated data packet(s) towards an "egress CPE" via the core network. The egress CPE may receive the encrypted and/or encapsulated data packet(s) from the core network and transmit these data packet(s) to an intended destination node. In this disclosure, "CPE-Ax" refers to CPEs of a customer enterprise A. For example, CPE-A1, CPE-A2, and CPE-A3 refer to CPEs for a customer enterprise A. Similarly, for a different customer B, the CPEs may be denoted by "CPE-Bx" and so on.

In accordance with the embodiments of this disclosure a core node is disclosed. The core node in a core network comprises a processor and a memory storing computer-executable instructions that when executed, cause the processor to transmit, a single aggregated discovery message periodically on behalf of a group of enterprise nodes associated with a first multicast group address. According to the embodiments of this disclosure the first multicast group address is one of one or more multicast group addresses associated with the core node and the group of enterprise nodes. Further, the processor of the core node exchanges one or more crates with a set of core nodes in the core network by advertising the one or more crates over a broadcast channel. Each of the one or more crates advertised by the core node comprises information corresponding to the one or more multicast group addresses associated with the core node. Further, according to the embodiments of this disclosure the set of core nodes have an active status indicated by the single aggregated discovery message.

In accordance with the embodiments of this disclosure, the computer-executable instructions that when executed, further cause the processor to receive a data packet from an enterprise node of the group of enterprise nodes associated with the first multicast group address and to determine a path to traverse the data packet from the core node to another enterprise node associated with the first multicast group address based on the one or more crates exchanged by the set of core nodes in the core network. Further, according to the embodiments of this disclosure, the path comprises one or more core nodes having the active status indicated by the single aggregated discovery message. Also, in accordance with the embodiments of this disclosure, the computer-executable instructions that when executed, further cause the processor to transmit the data packet to the one or more core nodes comprised in the path.

In accordance with the embodiments of this disclosure, each of the one or more crates represents an aggregated set of multicast group addresses of the one or more multicast group addresses associated with the core node.

In accordance with the embodiments of this disclosure, each of the one or more crates comprises a plurality of bits that masks the aggregated set of multicast group addresses.

Further, in accordance with the embodiments of this disclosure, the one or more multicast group addresses correspond to network identifiers used to group together the group of enterprise nodes of the one or more enterprise networks.

In accordance with the embodiments of this disclosure, the computer-executable instructions that when executed, further cause the processor to discard data packets corresponding to one or more multicast group addresses that are not associated with the core node.

Further, in accordance with the embodiments of this disclosure, the single aggregated discovery message comprises one or more discovery messages corresponding to respective one or more active core nodes. Also, in accordance with the embodiments of this disclosure, the single aggregated discovery message is a function of number of core nodes in the core network.

The various embodiments throughout the disclosure will be explained in more detail with reference to figures.

FIG. 1 illustrates a network architecture 100, in accordance an embodiment. In this embodiment, the network architecture 100 may include a core network 102 operated by a service provider and an enterprise network 104 operated by customer A and located at site 1. The network architecture 100 may also include an enterprise network 106 operated by the same customer A and located at site 2 that may be geographically separated from site 1. Further, the core network 102 may represent a network owned and/or operated by the service provider to provide connectivity services to one or more customers, such as customer A depicted in FIG. 1. For example, the enterprise network 104 may communicate with the enterprise network 106 in a secure manner via the core network 102.

A person skilled in the art would understand that it is not necessary that the enterprise network 104 and enterprise network 106 are operated by the same customer and they may be owned/managed by different customers as well. For example, both these enterprise networks may either be different internal networks (e.g., intranets) of the same organization, at different geographical locations or they may be networks owned, managed, and operated by separate organizations, at different locations. Additionally, there can be any number of enterprise networks in the network architecture 100 and one or more of these enterprise networks may be operated by one customer while the remaining may be owned by other customer(s). Further, such enterprise networks may be located geographically in different locations, which may either be in proximity to each other or remotely located with respect to each other. It would be apparent to a person skilled in the art that an enterprise may include more than one enterprise networks at multiple locations. FIG. 1 merely exhibits a non-limiting example of enterprise networks 104 and 106 that are located at different geographical locations. However, any number of enterprise networks without geographical limitations, may be included herein to implement the embodiments presented herein. Other configurations and scenarios are also possible where information can be exchanged between sites of one enterprise and/or between sites of another enterprise irrespective of whether all such sites are remotely located or not with respect to each other.

Referring to FIG. 1, the core network 102 may represent backend infrastructure that may provide routing paths for exchange of information between different enterprise networks such as enterprise networks 104 and 106. The core network 102, in some embodiments, may be referred to as the service provider network (or network core or service provider core or backbone network) without departing from the scope of the ongoing description. The core network 102 may include one or more core nodes C1 to Cn, as shown in FIG. 1, as described earlier in this disclosure.

In one example, the ingress CPE (e.g., CPE-A1) and the egress CPE (e.g., CPE-A2) may be a part of the enterprise network 104 and the enterprise network 106, respectively. Further, the core network 102 may communicate with the enterprise networks (e.g., 104, 106) through at least one enterprise node (e.g., CPE-A1, CPE-A2). Thus, the core network 102 may facilitate exchange of information between enterprise networks 104 and 106.

It would be apparent to a person skilled in the art that an enterprise (such as enterprise A) may include more than one enterprise networks at multiple locations. FIG. 1 merely exhibits a non-limiting example of two remote sites of enterprise A. Other configurations and scenarios are also possible where information can be exchanged between multiple sites of enterprise A. Information may be exchanged between one or more sites of the enterprise A and one or more sites of other enterprise(s) B, C, D and so on, and irrespective of whether all such sites are remote or proximate with respect to each other.

Figure 2:
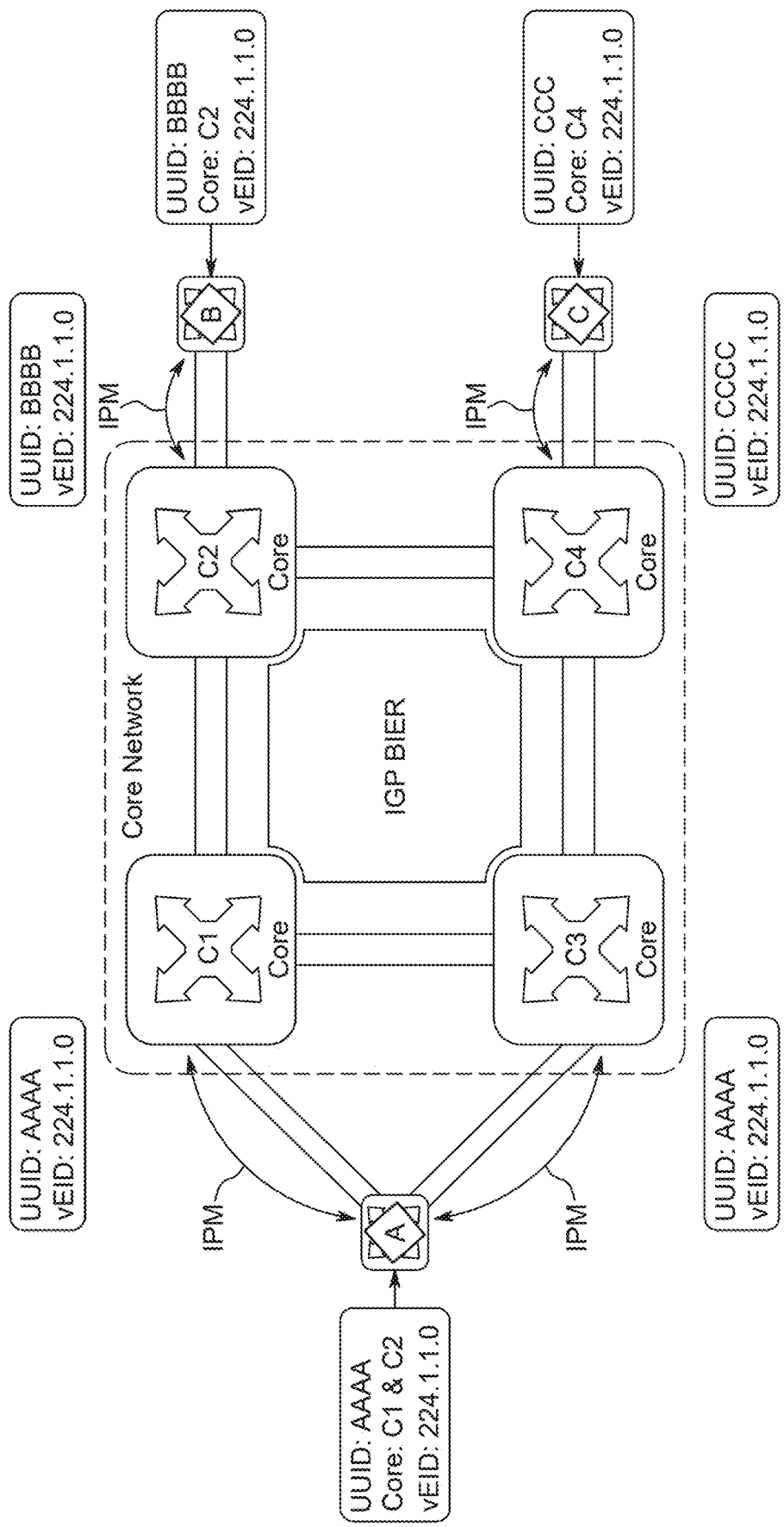
FIG. 2 illustrates an example network topology and message bus in a core network according to an embodiment.

FIG. 2 illustrates an example network topology and message bus in a core network 102 according to an embodiment. As depicted in FIG. 2, the network topology includes one or more enterprise nodes or CPEs (e.g., CPE-A, CPE-B, and CPE-C), and one or more core nodes (e.g., C1, C2, C3, and C4) in the core network 102.

In an embodiment, core network 102 may be implemented as a plain label switched network of nodes. In an embodiment, the core network 102 may not have any customer specific control plane information and may not have visibility into customer traffic encrypted by the CPEs.

In an embodiment, a data packet may refer to an IP packet which is to be routed from a source node to a destination node through first enterprise node (CPE-A), ingress core node (C1), intermediate core node (C2), egress core node (C4), and second enterprise node (CPE-C).

Specifically, with reference to FIG. 2, the IP packet originates at the source node, such as an endpoint device, and is received by the first enterprise node CPE-A. Then, CPE-A may perform encryption/encapsulation to generate an encapsulated/encrypted IP packet and transmit the encapsulated/encrypted IP packet to the ingress core node C1. Subsequently, C1 may forward the encapsulated/encrypted IP packet to the intermediate core node C2, which may further forward the encapsulated/encrypted IP packet to the egress core node C4. C4 may subsequently transmit the encapsulated/encrypted IP packet to the enterprise node CPE-C. Further, CPE-C may decapsulate/decrypt the encapsulated/encrypted IP packet and route the decapsulated/decrypted IP packet to the destination node, such as another endpoint device which is communicatively coupled to CPE-C.

Although the IP packet is shown to be routed via the ingress core node C1, intermediate core node C2, and egress core node C4, one skilled in the art may readily ascertain that instead of multiple core nodes in the core network 102, there may be fewer core node(s) that are connected to CPE-A and CPE-C. It will be apparent to a person with ordinary skill in the art that the embodiments explained with multiple core nodes throughout the disclosure can be analogously applied to scenarios having a single core node without undue experimentation.

In the illustrated non-limiting example of FIG. 2, the core network 102 is implemented as a segment routed MPLS label switched network. In the core network 102, for example, four core nodes are deployed namely C1, C2, C3, and C4. A first communication link may be established between the core nodes C1 and C2, a second communication link may be established between the core nodes C2 and C4, a third communication link may be established between the core nodes C3 and C4, and a fourth communication link may be established between the core nodes C1 and C3. Further, as depicted in FIG. 2, the CPE-A is connected to core nodes C1 and C3, the CPE-B is connected to core node C2, and the CPE-C is connected to core node C4.

In an embodiment, the communication between the core node C1, C2, C3, and C4 may be based on Bit Index Explicit Replication (BIER) approach. "BIER" is a mechanism that uses an encapsulation in MPLS and non-MPLS networks for forwarding multicast traffic. In this embodiment, the core network infrastructure utilizes BIER for multicast scenarios. BIER architecture allows optimal forwarding of multicast packets without requiring a legacy multicast protocol to build multicast trees or for intermediate routers to maintain any per-multicast flow state. Such an implementation provides a simplified control plane since BIER information is distributed using underlay IGP. Accordingly, each of the core nodes will be assigned a unique bit position in the BIER bit field. Multicast traffic may be routed/replicated based on the BIER bits in the data packet. As depicted in FIG. 2, each core node in the core network 102 is assigned unique BIER bit(s). For example, BIER bits 0001, 0010, 0100, and 1000 are assigned respectively to core nodes C1, C2, C3, and C4 for multicast transmission.

As shown in FIG. 2, CPE-A, CPE-B, and CPE-C may have a preconfigured identifier known as universally unique identifier (UUID). For example, the UUID for CPE-A is "AAAA", CPE-B is "BBBB", and CPE-C is "CCCC". The disclosed embodiments are not limited to the above mentioned UUIDs and other identifiers may be used as long as the uniqueness of the ID for each CPE is achieved. More particularly, as known in the art, UUID is a 128-bit label used for information exchange in computer systems. The term globally unique identifier (GUID) may also be used, interchangeably with the term UUID. UUIDs are, for practical purposes, unique and anyone can create a UUID for uniquely addressing CPEs. Information labeled with UUIDs by independent parties can therefore be later combined into a single database or transmitted on the same channel, with a negligible probability of duplication. As UUIDs are well known, so further discussion on them is skipped for the brevity of this disclosure.

As shown in FIG. 2, a UUID of a particular CPE is preconfigured and is known to a core node that directly connects/communicates with the particular CPE. For example, the preconfigured UUID of the CPE-A is "AAAA" and is known to the core node C1 and core node C3. Similarly, the preconfigured UUID of the CPE-B is "BBBB" and is known to the core node C2, and the preconfigured UUID of the CPE-C is "CCCC" and is known to the core node C4, as shown in FIG. 2. Also, a CPE knows the core nodes to which it is directly connected to. In this embodiment, the CPE-A is directly connected to core code C1 and core node C3. Further, the CPE-B is directly connected to core node C2 and CPE-C is directly connected to core node C4. All this connectivity information is already available at the core nodes and the CPEs.

Further, as shown in FIG. 2, each core node C1, C2, C3, and C4 and each CPE, CPE-A, CPE-B, and CPE-C are associated with at least one multicast group address (e.g., 224.1.1.0). A person of ordinary skill may understand that it is not necessary that all the core nodes and/or all the CPEs may be a part of a single group. For example, only a subset of all the core nodes and/or a subset of all the CPEs may be a part of a first group having a first multicast group address. Another subset of all the core nodes and/or another subset of all the CPEs may be a part of a second group having a second multicast group address. The multicast group address associated with each group is unique and is preconfigured in all the core nodes and all the CPEs that are a part of the respective group.

In an embodiment, the links between the core nodes may correspond to Open System Interconnect (OSI) layer 1 (L1) or layer 2 (L2) including but not limited to time division multiplexing (TDM) circuits, optical ethernet, etc. In an embodiment, the links between the core nodes may correspond to a layer 3 (L3) cloud transport including Internet. In cases of multi-hop between the core nodes, any number of tunneling technologies including but not limited to Generic Routing Encapsulation (GRE), IPSec, IPinIP, etc. with label switching over the tunnels may be utilized. In an embodiment, the link between the CPEs and core nodes i.e., CPE-Core links may correspond to point-to-point L2 connections, L3 connections, or IPSec tunnels.

For secure communication of data packets through a network, various encryption techniques defined by the IPsec standard may be implemented to encrypt the data packets. For example, one or more encryption algorithms such as, but not limited, Encapsulating Security Payload (ESP)-based encryption, Advanced Encryption Standard (AES)-based encryption, Data Encryption Standard (DES)-based encryption, and Triple-DES based encryption may be used to encrypt the data packet. In one example, the ESP protocol may be used to encrypt, encapsulate, and authenticate the data packet that is communicated between the core network 102 and the enterprise networks 104 and 106. Additionally, the encryption herein may also include one or more encapsulation techniques to encapsulate the data packet to enhance security in the data packet. For instance, the deployed encapsulation techniques may include, but not limited to, an ESP encapsulation or a generic routing encapsulation (GRE). Any of these encapsulation techniques may be used with any other encryption technique, without departing from the scope of the ongoing description.

The step-by-step process to route the data packet from one point to another using the network service architecture will be explained for multicast scenario in subsequent figures and associated description.

Figure 3:
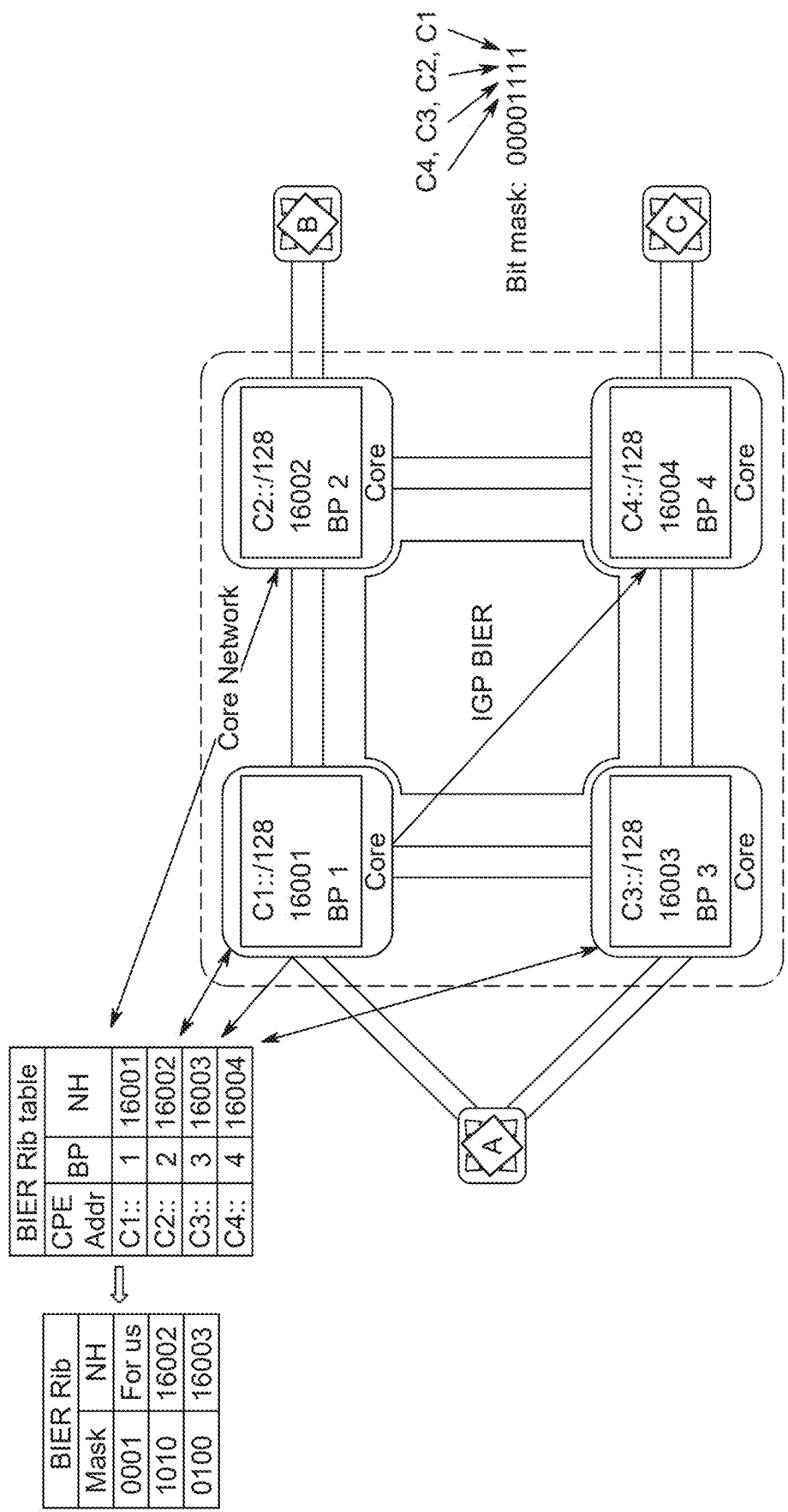
FIG. 3 illustrates an example multicast scenario to deliver a multicast packet from a core node C1 to multiple core nodes (C2 and C4).

FIG. 3 illustrates an example multicast scenario to deliver a multicast packet from a core node C1 to multiple core nodes (C2 and C4). FIG. 3 will be explained in conjunction with description of FIG. 2.

In the illustrated example in FIG. 3, an enterprise node, or a CPE such as CPE-A is deployed at site 1 of Enterprise A. In an embodiment, any device such as an endpoint device in the enterprise network 104 may be the source node that transmits data packets to CPE-A. Subsequently, after deploying CPE-A, a link, between the CPE (e.g., CPE-A) of enterprise A in the enterprise network 104 and a core node (e.g., C1) in the core network 102, is established during set-up process.

As illustrated in FIG. 3, in order to route a multicast packet from core node C1 to core nodes C2 and C4, the BIER bits need to be set to 1010. Once the BIER bits of the multicast packet are set, the received multicast packet at core node C1 may be routed to core node C2 and subsequently routed to core node C4 based on the set BIER bits of the multicast packet. Next, the core nodes C2 and C4 send the multicast packet to CPEs connected to the respective core nodes C2 and C4. Accordingly, the data packet may be routed (and replicated as needed) through the core network 102 based on the set BIER bits.

As shown in FIG. 3, the core node has a 128-byte long UUID indicating the address of the core node C1, as described earlier with reference to FIG. 2. Also, as described earlier with reference to FIG. 2 and reproduced in current FIG. 3 as well, each of the core nodes may be assigned a unique bit position (BP) in the BIER bit field. Multicast packet may be routed/replicated based on the BIER bits in the multicast packet. As depicted in FIG. 3, each core node in the core network 102 may be assigned unique BIER bit(s). In the illustrated example, BIER bits 0001 (BP1), 0010 (BP2), 0100 (BP3), and 1000 (BP4) are assigned respectively to core nodes C1, C2, C3, and C4 for multicast transmission. These bit positions may be advertised using any known routing protocols like open shortest path first (OSPF) to enable other core nodes to create the BIER forwarding information base (FIB) tables. Also, the next hop (NH), as shown in FIG. 3 is determined based on the bits in the received multicast packet.

As shown in the BIER Routing information base (Rib) table depicted in FIG. 3 and herein after referred to as "BIER table", a 128-byte long UUID indicating the address of the core node C1 is mapped to the BP of the unique bits assigned to each core node in the core network 102. The BP of the unique bits assigned to each core node in the core network 102 is further mapped to the NH determined based on the bits in the BIER header of the received multicast packet. A BIER table is a routing table that each node needs to keep track of which way to deliver various data packets. More particularly, whenever a node needs to send data to another node on a network, it must first know where to send it. If the node cannot directly connect to the destination node, it may send it via other nodes along a route to the destination node. The BIER table contains information about the topology of the network immediately around it.

As shown in the first table of FIG. 3, a BIER Rib consisting of a mapping between the NH and BIER bits in the multicast packet is performed to determine a bit mask for routing the received multicast packet. As an illustration, if CPE-A wants to send a multicast packet to core nodes C2 and C4, the bit mask for such a multicast packet will be 00001010. Core node C1 connected to the CPE-A receives the multicast packet from the CPE-A and forwards the multicast packet based on the bit mask determined using the BIER tables, as discussed above. The multicast packet is forwarded by the core node C1 based on address information in the BIER header of the multicast packet without storing the details or the content of the multicast packet. As such, the core nodes merely forward the multicast packets based on the address information in the BIER header of the multicast packet and do not store the data comprised in the multicast packets. Thus, stateless multicast forwarding is achieved by the core nodes while forwarding the multicast packet based on the address information in the BIER header of the multicast packet. All intermediate core nodes merely forward the multicast packet and do not store the actual data comprised in the multicast packet. In fact, all the intermediate core nodes are "hop-on" core nodes that are used for forwarding the multicast packet without looking at the actual contents of the multicast packet. Hence, such forwarding of the multicast packet by the core nodes is termed as stateless multicast forwarding.

Figure 4:
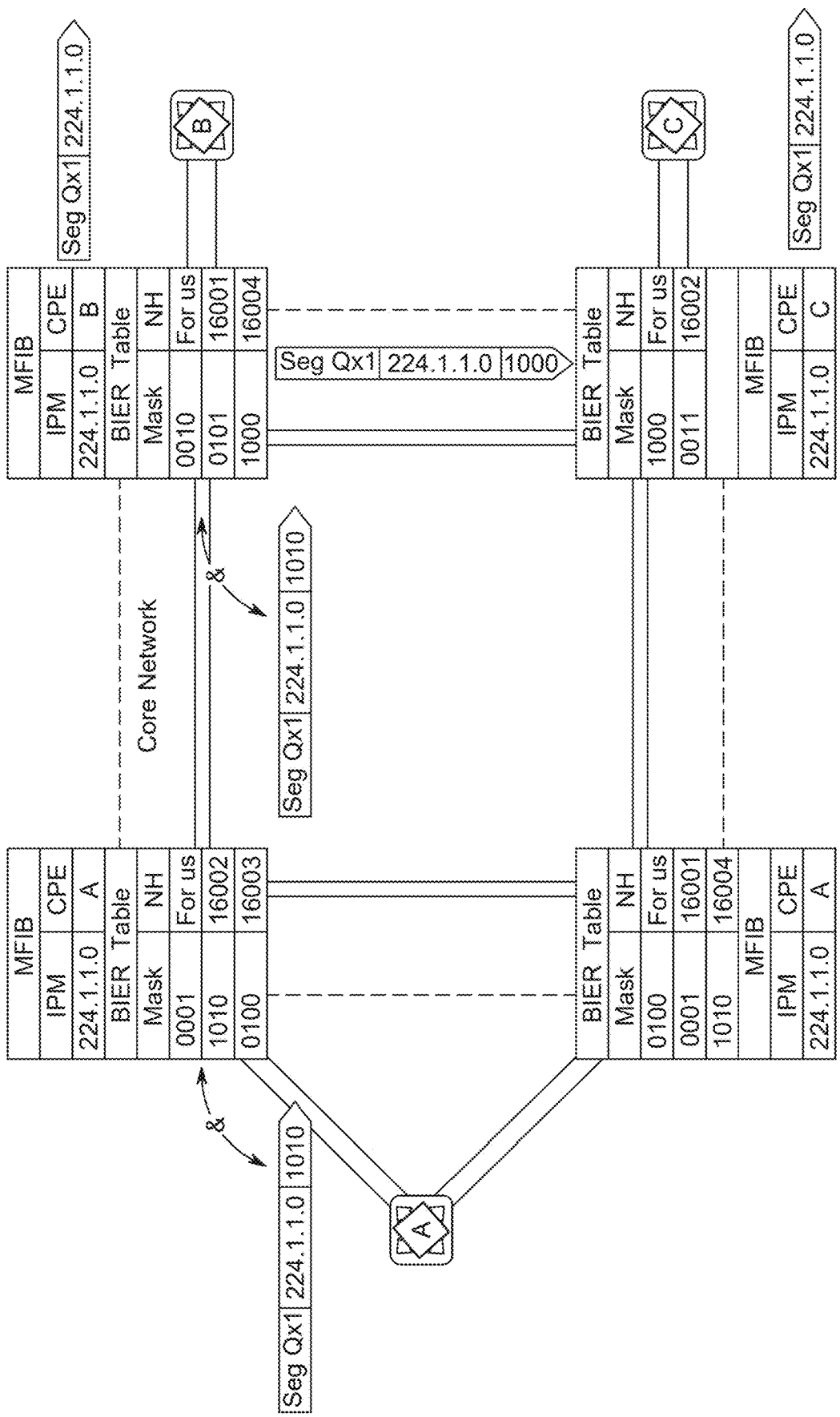
FIG. 4 illustrates an example multicast scenario to deliver a multicast packet from an enterprise node CPE-A to other enterprise nodes CPE-B and CPE-C through one or more core nodes.

FIG. 4 illustrates an example multicast scenario to deliver a multicast packet from an enterprise node CPE-A to other enterprise nodes CPE-B and CPE-C through one or more core nodes. FIG. 4 will be explained with reference to description of FIG. 2 and FIG. 3.

With reference to FIG. 4, the same process for delivering a multicast packet from a core node C1 to multiple core nodes (C2 and C4) is followed as described with reference to FIG. 3 above.

With reference to FIG. 4, in an embodiment, a multicast packet sent by CPE-A has two headers on the multicast packet. The first header may be the IP multicast header with multicast address and the second header may be the BIER header, that is used to forward the multicast packet through the core network 102. As shown in FIG. 4, multicast forwarding information base (MFIB) tables may be created by each core node comprising the preconfigured IP multicast address and the information on the CPE that is directly connected to the respective core node. For example, the preconfigured IP multicast address for core node C1 is 224.1.1.0 and the CPE-A is directly connected to the core node C1 as represented in FIG. 4. Similarly, the MFIB table for each core node B, C, and D is indicated in FIG. 4.

According to an embodiment, for a CPE to send a packet it needs to know bit mask (form the BIER Header) and the IP multicast group address. Both these are signaled to the CPE through control plane. When the CPE-A sends a multicast packet to CPE-B and CPE-C, first the multicast packet is received by the core node C1. Core node C1 looks at the BIER table as illustrated in FIG. 4 (and described in detail in FIG. 3) to determine the corresponding bit mask and forwards the multicast packet to core node C2. The core node C2 also looks at the BIER table and determines the corresponding bit mask. Since, CPE-B is directly connected to the core node C2, therefore based on the mapping from the BIER table, the core node C2 determines that one of the destinations for the multicast packet is CPE-B. Also, based on the bit mask and the BIER table, the core node C2 determines that the multicast message is to be forwarded to the core node C4. The core node C4 also looks at the BIER table and determines the corresponding bit mask. Since, CPE-C is directly connected to the core node C4, therefore based on the mapping from the BIER table, the core node C4 determines that the other destination for the multicast packet is CPE-C and accordingly forwards the multicast packet to CPE-C.

In an embodiment, when CPE-A sends multicast packets using the IP multicast group header and the BIER header, the CPE-A can address all the other CPEs that are a part of the same group by using a multicast group identifier or vEID (e.g., 224.1.1.0) associated with the group as shown in FIG. 4. It is important for CPEs to know which other CPEs participate inside a multicast group for the purpose of reliability. In an embodiment, this is achieved by having each CPE send out "Hello" messages to the specific multicast group. Sending out "Hello" messages over a medium, such as tunnel, is a common and well-known way for sending out a discovery message. However, in the current embodiment, if there are many CPEs and each CPE starts sending a packet on a message bus periodically, it would mean that each CPE will receive multiple "Hello" messages from other CPEs which may not be optimal as described earlier.

However, according to the disclosed approach, each core node is aware of which multicast group it is connected to because as described earlier (with reference to FIG. 2 and FIG. 3), each core node is preconfigured with the vEID of the multicast group associated with it. According to the disclosed approach, to make the multi-tenant network service environment more efficient, a given core node may generate "Hello" messages on behalf of the CPEs. As such, a given core node aggregates "Hello" messages from all the connected CPEs that are part of the same vEID in a single aggregated packet or a single aggregated "Hello" message. For example, as shown in FIG. 4, the core nodes C1 and C3 are connected to CPE-A and are a part of the multicast group represented by the vEID 224.1.1.0. Similarly, the core nodes C2 and C4 are connected to CPE-B and CPE-C and are a part of the multicast group represented by the vEID 224.1.1.0.

In an embodiment, when a CPE (or a CPE connection with the core node) is down, the core node may withdraw the "Hello" message corresponding to that CPE from the single aggregated "Hello" message. Also, in such a case, the core node may trigger an update or a recovery action for the CPE that is down by advertising the "down" status of the CPE to the other CPEs. This would not work when each CPE is sending an individual "Hello" message as in the conventional methods.

The advantage of the disclosed solution is an optimized CPE to CPE discovery mechanism, using an in-line stateless message bus, by having the core nodes aggregate the number of "Hello" messages sent by each CPE that are a part of a specific group (represented by a unique vEID). More particularly, this may be achieved by having a given core node aggregate the "Hello" messages from all the connected CPEs that are part of the same multicast group identifier into a single packet or string of bits. The consequent reduction of the number of "Hello" messages enable more CPEs, that are part of the same multicast group identifier, to be connected to the given core node without increasing or adding to the number of "Hello" messages. Thus, the reduction in the number of "Hello" messages benefit the system architecture as a larger number of CPEs (that are part of the same EID) can be connected to the same core node without impacting the processing and communication overheads. This is because a single "Hello" message generated from the core node can include and represent "Hello" messages from many CPEs. The number of "Hello" messages that may be originated according to the embodiment of this invention is a function of the number of core nodes and not the number of CPEs.

Another advantage of the disclosed approach is that a core node can advertise a "down" status of a CPE to other CPEs. When a CPE is down, it is unable to signal any status indicating that it is down, to other CPEs because it cannot transmit anything in the "down" state. Also, a core node advertises its membership in various multicast group identifiers to all other core nodes in the core network as the core node does not know which other core nodes have potential interest in it. This enables each core node that has received the advertisement from other core nodes to use this information to determine a next hop (core node) to transfer the received packets towards a recipient CPE.

As shown in FIG. 4, a core node knows which vEIDs are associated with the specific core node. However, the core node does not know which other core nodes are associated with the vEIDs associated with the specific core node. For example, core node C1 knows that the core node C1 is a part of the vEID 224.1.1.0, but the core node C1 does not know which other core nodes of the core network 102 may be a part of the same vEID 224.1.1.0. The embodiments of the present invention provide a solution to this problem and other problems discussed earlier by proposing a mechanism called "crates".

Figure 5:
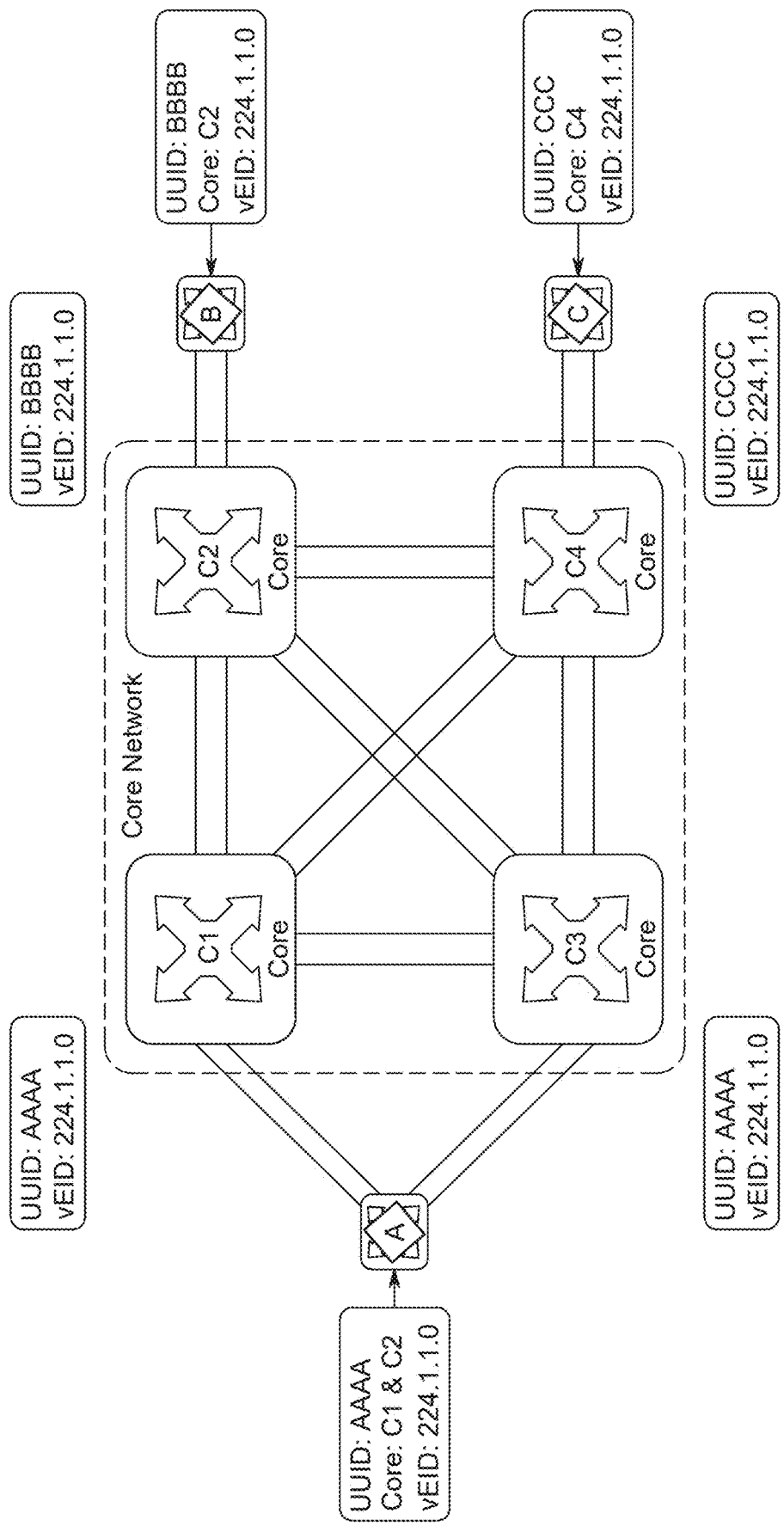
FIG. 5 illustrates another example network topology and message bus in a core network according to an embodiment.

FIG. 5 illustrates another network topology depicting connections between the core nodes of a core network 102 according to an embodiment. FIG. 5 will be explained in reference to the description of FIG. 1 and FIG. 2 and the descriptions corresponding to FIG. 1 and FIG. 2 are incorporated herein in its entirety. As depicted in FIG. 5, the network topology includes one or more enterprise nodes or CPEs (e.g., CPE-A, CPE-B, and CPE-C), and one or more service provider core nodes (e.g., C1, C2, C3, and C4) in the core network 102. In accordance with the present disclosure, a CPE knows the core nodes to which the CPE is directly connected. In this embodiment, the CPE-A is directly connected to core code C1 and core node C3. Further, the CPE-B is directly connected to core node C2 and CPE-C is directly connected to core node C4. All this information is already available at the core nodes and the CPEs.

Also, as shown in FIG. 5, each core node is connected to all other core nodes of the core network 102. For example, each of C1, C2, C3, and C4 is connected to one other. For example, C1 is connected to C2, C3, and C4. Similarly, C2 is connected to C1, C3, and C4. Also, C3 is connected to C1, C2, and C4 whereas C4 is connected to C1, C2, and C3. It may be emphasized that FIG. 5 is an exemplary embodiment showing that each core node is connected to all other core nodes of the core network 102 in the manner as depicted in FIG. 5. However, it may be well understood that only some core nodes of a core network 102 may be connected to each other without departing from the scope of the disclosure.

Figure 6:
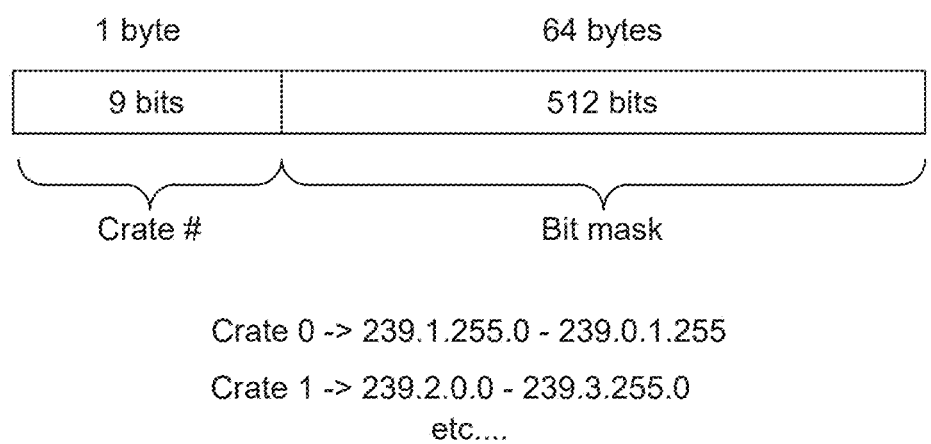
FIG. 6 illustrates the structure of a crate.
Figure 8:
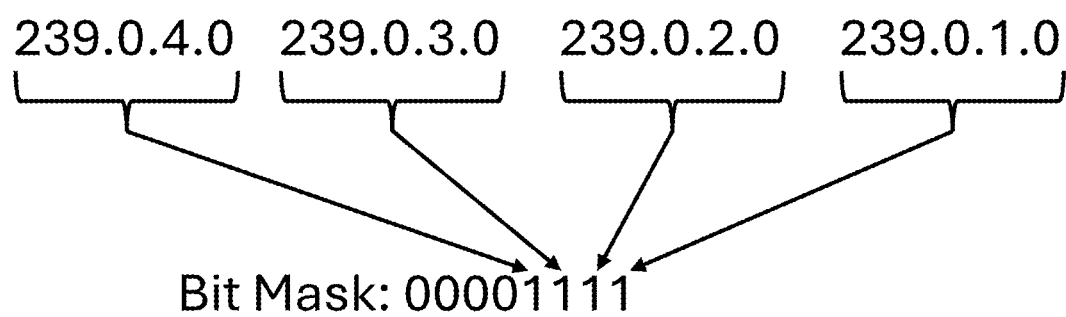
FIG. 8 illustrates a scenario where an enterprise allows 256 VPNs and bit positions are allocated to describe a multicast address.

FIG. 6 illustrates an exemplary structure of a crate in accordance with an embodiment. The disclosed approach proposes crates as a mechanism of compression used in vEIDs, which are basically multicast addresses. In other words, crates may be referred to as a mechanism to compress multicast address or crates may be a mechanism of compression of multicast addresses. By way of illustration, considering a scenario where an enterprise allows 256 VPNs, for example, 239.0.1.0, 239.0.2.0, 239.0.3.0, 239.0.4.0, etc. and bit positions are allocated to describe the multicast address, which is represented in FIG. 8. The bit mask may be created based on the VPN address as shown above. Although, the bit mask is represented for only 4 VPN addresses, however, in this embodiment, the bit mask can be calculated for all the 256 VPNs associated with the enterprise. In this embodiment, the VPN address 239.0.X.0 is allocated by the enterprise. However, what makes each EID unique is the value "X", thereby eliminating the need to advertise the complete VPN address, or the complete multicast address associated with a specific core node in every packet. In this embodiment, the value of "X" as a bit position in a string of bits comprising the bit mask may be advertised and this compression of the multicast address as a bit position in a string of bits is referred to in this description as "crates". Each multicast address indicates a bit position in the crate, which can be either set ("1") or not set ("0"). For example, the bit position for a specific multicast address may be set when a core node is a part of the specific multicast address and the bit position for a specific multicast address may not be set when a core node is not a part of the specific multicast address. Thus, the collection of bit positions shipped together may be referred to as a "crate of bits".

As shown in FIG. 6, in an embodiment, each crate may be 64 bytes or 512 bits long. The structure of the crate is depicted in FIG. 6, where the crate number is represented in the first byte and the bit mask is represented in the 64 bytes of the crates. An example crate structure is depicted in FIG. 6.

By way of an illustrative example, in a single packet of 1400 bytes, 21 crates (1400/65=21) can be advertised, which means 10.7K EIDs or 10.7 multicast group addresses (21*512=10.7K) may be advertised in a single packet. The disclosed encoding supports up to 131K multicast group ranges (512*256=131 K). According to an embodiment, a core node may only advertise the crates in which the core node has a membership. A core node that may be advertising its membership does not know which other core nodes have potential interest in knowing the membership of that core node. For that reason, each core node needs to advertise its membership in the form of crates to all core nodes of the core network 102. So, each core node may broadcast its membership information pertaining to the membership in multicast groups represented as bit positions in crates. For example, open shortest path first (OSPF) flooding may be used for this broadcast by the core node, or any other appropriate protocol may be used without departing from the scope of this disclosure. As soon as a core node receives an update on the membership of other core nodes in the core network 102, the core node may use this membership information to compute the bit mask to reach the specific EID addressed by the multicast packet.

In some embodiments, although an in-line control plane is illustrated in the figures for control plane, other models including a centralized controller approach may be implemented without departing from the scope of the ongoing description.

Figure 7:
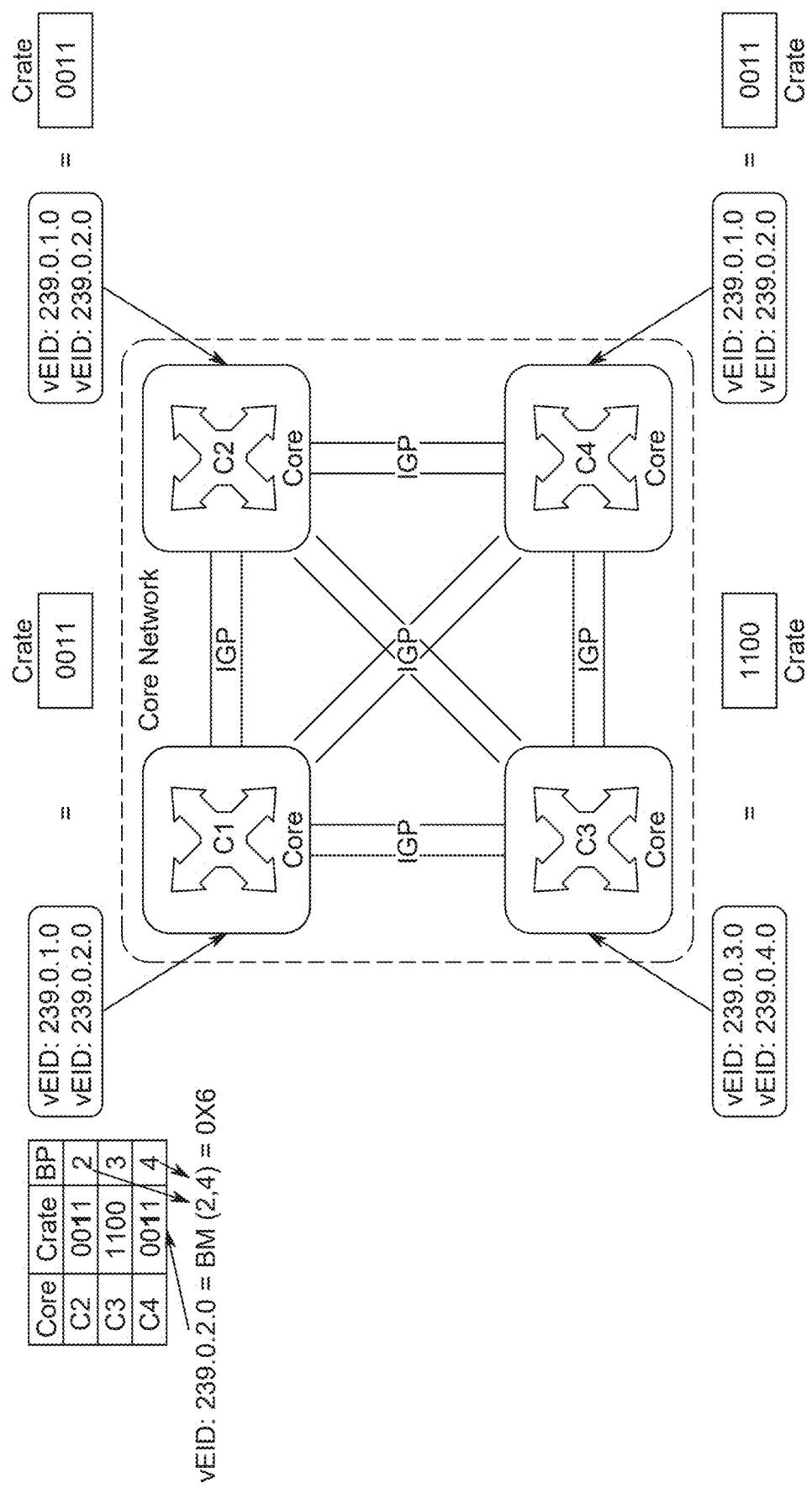
FIG. 7 illustrates an exemplary data path for a multicast scenario in the topology of FIG. 1 in accordance with an embodiment.

FIG. 7 illustrates an exemplary data path for a multicast scenario in the topology of FIG. 1 in accordance with an embodiment. FIG. 7 will be explained in reference to description of FIG. 1, FIG. 2, FIG. 3, FIG. 4, FIG. 5, and FIG. 6. With reference to FIG. 7, the data path for communicating a (multicast) data packet from a source node to a destination node will be explained. Initially, the data packet (such as a multicast packet) may be originated by the source node, such as a user endpoint device, which is communicatively coupled to ingress CPE, i.e., CPE-A of enterprise A. The multicast packet is to be communicated to the destination node.

As shown in FIG. 7, the core nodes may be associated with different multicast group addresses (vEID). For example, the core nodes C1, C2, and C4 are a part of vEIDs 239.0.1.0 and 239.0.2.1. Further, the core node C3 is a part of vEIDs 239.0.3.0 and 239.0.4.0. The membership information may be communicated by the core nodes C1, C2, and C4 by broadcasting the crate 0011 to all core nodes in the core network 102. The status of the bits ("set" or "not set") indicates the membership status of the core node with respect to the specific multicast address. Further, the core node C3 transmits the crate 1100 indicating that the core node C3 has a membership in the multicast addresses indicated by setting the corresponding bit positions.

According to an embodiment, a table showing a mapping between a core node and its corresponding bit position in the crate is shown in FIG. 7. Also, the table indicates the membership of the core node in the multicast groups through crates.

The disclosed methods may be performed by processing logic that may include hardware (circuitry, dedicated logic, etc.), software (such as run on a general-purpose computer system or a dedicated machine), or a combination of both. The processing logic may be included in any node or device (e.g., core node, CPEs, controller etc.), or any other computing system or device. A person with ordinary skill in the art will appreciate that the disclosed method is capable of being stored on an article of manufacture, such as a non-transitory computer-readable medium. In an embodiment, the article of manufacture may encompass a computer program accessible from a storage media or any computer-readable device.

In accordance with the embodiments of this disclosure, a method is disclosed. The method includes transmitting, by a core node, a single aggregated discovery message periodically on behalf of a group of enterprise nodes associated with a first multicast group address. The first multicast group address is one of one or more multicast group addresses associated with the core node and the group of enterprise nodes. The method further comprises exchanging, by the core node, one or more crates with a set of core nodes in the core network by advertising the one or more crates over a broadcast channel. Each of the one or more crates advertised by the core node comprises information corresponding to the one or more multicast group addresses associated with the core node. Further, the set of core nodes have an active status indicated by the single aggregated discovery message.

In accordance with the embodiments of this disclosure, the method further comprises receiving, by the core node, a data packet from an enterprise node of the group of enterprise nodes associated with the first multicast group address and determining, by the core node, a path to traverse the data packet from the core node to another enterprise node associated with the first multicast group address based on the one or more crates exchanged by the set of core nodes in the core network. Further, the path comprises one or more core nodes having the active status indicated by the single aggregated discovery message. In accordance with the embodiments of this disclosure, the method further comprises transmitting the data packet to the one or more core nodes comprised in the path.

In accordance with the embodiments of this disclosure, each of the one or more crates represents an aggregated set of multicast group addresses of the one or more multicast group addresses associated with the core node.

In accordance with the embodiments of this disclosure, each of the one or more crates comprises a plurality of bits that masks the aggregated set of multicast group addresses.

In accordance with the embodiments of this disclosure, the one or more multicast group addresses correspond to network identifiers used to group together the group of enterprise nodes and wherein the group of enterprise nodes are enterprise nodes of one or more enterprise networks.

In accordance with the embodiments of this disclosure, the group of enterprise nodes is pre-configured to be associated with the one or more multicast group addresses.

In accordance with the embodiments of this disclosure, the method further comprises discarding, by the core node, data packets corresponding to one or more multicast group addresses that are not associated with the core node.

In accordance with the embodiments of this disclosure, the single aggregated discovery message comprises one or more discovery messages corresponding to respective one or more active core nodes. Further, the single aggregated discovery message is a function of number of core nodes in the core network In accordance with the embodiments of this disclosure, another method is disclosed. The method includes exchanging one or more crates by a core node in the core network. The method comprises masking a set of multicast group addresses with bits indicating association of each corresponding multicast group address of the set of multicast group addresses with the core node. Further, the method includes dividing the masked bits into one or more crates for exchanging the one or more crates with a set of core nodes in the core network by advertising the one or more crates over a broadcast channel. The method further describes that the set of core nodes have an active status indicated by a single aggregated discovery message transmitted periodically on behalf of a group of enterprise nodes associated with a first multicast group address of the set of multicast group addresses. Further, according to the method, the core node is associated with the first multicast group address.

In accordance with the embodiments of this disclosure, the method further comprises receiving a data packet from an enterprise node of the group of enterprise nodes associated with the first multicast group address and deriving the corresponding multicast group address of the set of multicast group addresses from the masked bits. In accordance with the embodiments of this disclosure, the corresponding multicast group address is associated with the core node and one or more core nodes from the set of core nodes. The method further comprises determining, a path to traverse the data packet from the core node to another enterprise node associated with the first multicast group address based on the corresponding multicast group address. According to the method, the corresponding multicast group address is indicated in the one or more crates exchanged by the set of core nodes in the core network and the path comprises the one or more core nodes having the active status indicated by the single aggregated discovery message. Further, the method comprises transmitting the data packet to the one or more core nodes comprised in the path.

In accordance with the embodiments of this disclosure, the single aggregated discovery message comprises one or more discovery messages corresponding to respective one or more active core nodes.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The present disclosure has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the SP network architecture described herein contain optional features that can be individually or together applied to any other embodiment shown or contemplated here to be mixed and matched with the features of that architecture.

While the invention has been described with respect to a limited number of embodiments, those skilled in the art, having benefit of this disclosure, will appreciate that other embodiments can be devised which do not depart from the scope of the invention as disclosed herein.

We claim:

1. A method in a core network, comprising:
    transmitting, by a core node, a single aggregated discovery message periodically on behalf of a group of enterprise nodes associated with a first multicast group address, wherein the first multicast group address is one of one or more multicast group addresses associated with the core node and the group of enterprise nodes;
    exchanging, by the core node, one or more crates with a set of core nodes in the core network by advertising the one or more crates over a broadcast channel, wherein each of the one or more crates advertised by the core node comprises information corresponding to the one or more multicast group addresses associated with the core node, and wherein the set of core nodes have an active status indicated by the single aggregated discovery message;
    receiving, by the core node, a data packet from an enterprise node of the group of enterprise nodes associated with the first multicast group address;
    determining, by the core node, a path to traverse the data packet from the core node to another enterprise node associated with the first multicast group address based on the one or more crates exchanged by the set of core nodes in the core network, the path comprising one or more core nodes having the active status indicated by the single aggregated discovery message; and
    transmitting the data packet to the one or more core nodes comprised in the path.

2. The method of claim 1, wherein each of the one or more crates represents an aggregated set of multicast group addresses of the one or more multicast group addresses associated with the core node.

3. The method of claim 2, wherein each of the one or more crates comprises a plurality of bits that masks the aggregated set of multicast group addresses.

4. The method of claim 1, wherein the one or more multicast group addresses correspond to network identifiers used to group together the group of enterprise nodes and wherein the group of enterprise nodes are enterprise nodes of one or more enterprise networks.

5. The method of claim 1, wherein the group of enterprise nodes is pre-configured to be associated with the one or more multicast group addresses.

6. The method of claim 1 further comprising:
    discarding, by the core node, data packets corresponding to one or more multicast group addresses that are not associated with the core node.

7. The method of claim 1, wherein the single aggregated discovery message comprises one or more discovery messages corresponding to respective one or more active core nodes.

8. The method of claim 1, wherein the single aggregated discovery message is a function of number of core nodes in the core network.

9. A core node in a core network comprising:
    a memory storing computer-executable instructions;
    a processor, based on execution of the computer-executable instructions, is configured to:
    transmit, a single aggregated discovery message periodically on behalf of a group of enterprise nodes associated with a first multicast group address, wherein the first multicast group address is one of one or more multicast group addresses associated with the core node and the group of enterprise nodes;
    exchange, by the core node, one or more crates with a set of core nodes in the core network by advertising the one or more crates over a broadcast channel, wherein each of the one or more crates advertised by the core node comprises information corresponding to the one or more multicast group addresses associated with the core node, and wherein the set of core nodes have an active status indicated by the single aggregated discovery message;
    receive a data packet from an enterprise node of the group of enterprise nodes associated with the first multicast group address;
    determine a path to traverse the data packet from the core node to another enterprise node associated with the first multicast group address based on the one or more crates exchanged by the set of core nodes in the core network, the path comprising one or more core nodes having the active status indicated by the single aggregated discovery message; and
    transmit the data packet to the one or more core nodes comprised in the path.

10. The core node of claim 9, wherein each of the one or more crates represents an aggregated set of multicast group addresses of the one or more multicast group addresses associated with the core node.

11. The core node of claim 10, wherein each of the one or more crates comprises a plurality of bits that masks the aggregated set of multicast group addresses.

12. The core node of claim 9, wherein the one or more multicast group addresses correspond to network identifiers used to group together the group of enterprise nodes of the one or more enterprise networks.

13. The core node of claim 9, wherein the processor, based on execution of the computer-executable instructions, is further configured to:
    discard data packets corresponding to one or more multicast group addresses that are not associated with the core node.

14. The core node of claim 9, wherein the single aggregated discovery message comprises one or more discovery messages corresponding to respective one or more active core nodes.

15. The core node of claim 9, wherein the single aggregated discovery message is a function of number of core nodes in the core network.

16. A method of exchanging one or more crates by a core node in the core network, comprising:

masking a set of multicast group addresses with bits indicating association of each corresponding multicast group address of the set of multicast group addresses with the core node;

dividing the masked bits into one or more crates for exchanging the one or more crates with a set of core nodes in the core network by advertising the one or more crates over a broadcast channel, wherein the set of core nodes have an active status indicated by a single aggregated discovery message transmitted periodically on behalf of a group of enterprise nodes associated with a first multicast group address of the set of multicast group addresses, and wherein the core node is associated with the first multicast group address;

receiving a data packet from an enterprise node of the group of enterprise nodes associated with the first multicast group address;

deriving the corresponding multicast group address of the set of multicast group addresses from the masked bits, wherein the corresponding multicast group address is associated with the core node and one or more core nodes from the set of core nodes;

determining, a path to traverse the data packet from the core node to another enterprise node associated with the first multicast group address based on the corresponding multicast group address, wherein the corresponding multicast group address is indicated in the one or more crates exchanged by the set of core nodes in the core network, and wherein the path comprises the one or more core nodes having the active status indicated by the single aggregated discovery message; and transmitting the data packet to the one or more core nodes comprised in the path.

17. The method of claim 16, wherein the single aggregated discovery message comprises one or more discovery messages corresponding to respective one or more active core nodes.

* * * * *